(12) United States Patent
Kaneko et al.

(10) Patent No.: US 11,993,919 B2
(45) Date of Patent: May 28, 2024

(54) WORK VEHICLE

(71) Applicant: Hitachi Construction Machinery Co., Ltd., Tokyo (JP)

(72) Inventors: Satoru Kaneko, Tokyo (JP); Akinori Kamiya, Tokyo (JP); Noritaka Itou, Tsuchiura (JP); Hiroshi Utashiro, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 718 days.

(21) Appl. No.: 17/265,640

(22) PCT Filed: Aug. 9, 2019

(86) PCT No.: PCT/JP2019/031544
§ 371 (c)(1),
(2) Date: Feb. 3, 2021

(87) PCT Pub. No.: WO2020/032225
PCT Pub. Date: Feb. 13, 2020

(65) Prior Publication Data
US 2021/0324607 A1 Oct. 21, 2021

(30) Foreign Application Priority Data
Aug. 10, 2018 (JP) .................... 2018-151140

(51) Int. Cl.
*H02P 3/14* (2006.01)
*B60W 10/08* (2006.01)
(Continued)

(52) U.S. Cl.
CPC .......... *E02F 9/2075* (2013.01); *E02F 9/2091* (2013.01)

(58) Field of Classification Search
None
See application file for complete search history.

(56) References Cited

U.S. PATENT DOCUMENTS 6,577,483 B1 * 6/2003 Steicher ............... H02P 3/18
318/370
9,366,012 B2 * 6/2016 Moriki ............... E02F 9/2075
(Continued)

FOREIGN PATENT DOCUMENTS

DE 10 2011 012 476 A1 8/2012
EP 2 815 946 A1 12/2014
(Continued)

OTHER PUBLICATIONS

International Search Report (PCT/ISA/210) issued in PCT Application No. PCT/JP2019/031544 dated Oct. 21, 2019 (two (2) pages).
(Continued)

*Primary Examiner* — Richard A Goldman
*Assistant Examiner* — Laura E Linhardt
(74) *Attorney, Agent, or Firm* — Crowell & Moring LLP

(57) ABSTRACT

In an electric drive system in which a battery is not connected to a DC bus, even when a load on a traveling electric motor increases suddenly, it is made possible to avoid such a situation that the DC bus voltage drops to a level equal to or lower than an operating voltage of an inverter and the inverter stops working. To this end, a DC bus voltage drop prevention device controls such that, when the voltage of the DC bus drops below a first threshold value, the output torque of the traveling electric motor is decreased according to an amount of decrease in the voltage of the DC bus, and when the voltage of the DC bus drops below a second threshold voltage lower than the first threshold voltage, the output torque of the traveling electric motor is decreased to zero or a value within a range of magnitude with which a work vehicle stays stationary on a level ground.

6 Claims, 10 Drawing Sheets

(51) Int. Cl.
  *B60W 10/26* (2006.01)
  *B60W 20/00* (2016.01)
  *E02F 9/20* (2006.01)
  *H02P 3/18* (2006.01)

(56) References Cited

U.S. PATENT DOCUMENTS

| | | | |
|---|---|---|---|
| 2003/0090225 A1* | 5/2003 | Posma | B60L 50/52 |
| | | | 318/376 |
| 2009/0251090 A1 | 10/2009 | Tanaka et al. | |
| 2012/0161679 A1 | 6/2012 | Goldammer et al. | |
| 2015/0267380 A1* | 9/2015 | Kaneko | B60L 50/40 |
| | | | 180/65.265 |
| 2020/0031233 A1* | 1/2020 | Campbell | B60L 3/003 |

FOREIGN PATENT DOCUMENTS

| | | |
|---|---|---|
| JP | 2007-267514 A | 10/2007 |
| JP | 2007-313992 A | 12/2007 |
| JP | 2009-214587 A | 9/2009 |
| JP | 2014-51252 A | 3/2014 |
| JP | 2014-507320 A | 3/2014 |
| JP | 2014-210569 A | 11/2014 |

OTHER PUBLICATIONS

Japanese-language Written Opinion (PCT/ISA/237) issued in PCT Application No. PCT/JP2019/031544 dated Oct. 21, 2019 (two (2) pages).
International Preliminary Report on Patentability (PCT/IB/338 & PCT/IB/373) issued in PCT Application No. PCT/EP2019/031544 dated Feb. 25, 2021, Including English translation of document C2 (German-language Written Opinion (PCT/ISA/237), filed on Feb. 3, 2021) (seven (7) pages).
Extended European Search Report issued in European Application No. 19846604.7 dated Apr. 12, 2022 (seven (7) pages).

* cited by examiner

WORK VEHICLE

TECHNICAL FIELD

The present invention relates to a work vehicle that travels with a load carried on a work device thereof.

BACKGROUND ART

In recent years, there has been a growing tendency toward energy saving in industrial products in terms of environmental issues, soaring crude oil prices and so forth. Also in construction vehicles and work vehicles that mainly adopt a hydraulic drive system by a diesel engine, efficiency enhancement and energy saving by electrification are proceeding. One example is described in Patent Document 1.

Patent Document 1 is a document describing a case in which a traveling portion of a dump truck is electrified and discloses a traveling drive system in which an AC generator is driven by a diesel engine and a traveling electric motor is driven with power generated by the AC generator to generate torque thereby to cause a vehicle to travel. Further, this prior art is configured such that a battery is not connected to a DC bus portion disposed between an inverter of the AC generator and an inverter of the traveling electric motor.

Meanwhile, Patent Document 2 describes a controller for an in-vehicle rotating machine, which performs mutual torque correction processing for correcting first command torque and second command torque in a direction in which a change amount of power of a first motor generator (AC generator) and a change amount of power of a second motor generator (traveling electric motor) balance with each other. Further, in this prior art, a battery is connected in parallel to a DC bus portion disposed between an inverter of the first motor generator and an inverter of the second motor generator (a battery is sometimes connected through a converter), and consequently, it is possible to suppress high power collection to the battery that occurs at the time of sudden change in the load and prevent deterioration of the battery.

PRIOR ART DOCUMENT

Patent Documents

Patent Document 1: JP-2007-313992-A
Patent Document 2: JP-2014-210569-A

SUMMARY OF THE INVENTION

Problem to be Solved by the Invention

In the prior art described in Patent Document 2, since torque mutual correction processing between the first motor generator and the second motor generator is performed, although the power collection amount to the battery is moderated, the voltage at the DC bus portion is managed by the power collection to the battery. Therefore, it is avoided that, at the time of a sudden change in the load on the second motor generator (traveling electric motor), the DC bus voltage becomes lower than the operating voltage of the inverters, and such a situation that the inverters are ceased to function and the inverters stop working.

On the other hand, as described in Patent Document 1, in an electric drive system in which a battery is not connected to a DC bus (a system covered by the present application), it is conceivable that, at the time of a sudden change in the load, the voltage at the DC bus (DC bus voltage) may be greatly fluctuated. For example, when the load on the traveling electric motor increases, it is conceivable that the DC bus voltage may be dropped. When the DC bus voltage becomes lower than the operating voltage of the inverters in this manner, it is conceivable that the inverters are ceased to function and the inverters stop working.

Therefore, the object of the present invention resides in provision of a work vehicle in which, even when the load on a traveling electric motor increases suddenly in an electric drive system in which a battery is not connected to a DC bus, such a situation can be avoided that the DC bus voltage drops to a level equal to or lower than the operating voltage of an inverter and the inverter stops working.

Means for Solving the Problem

In order to achieve the object described above, according to the present invention, there is provided a work vehicle comprising: an engine; a hydraulic pump driven by the engine; a hydraulic cylinder driven by hydraulic fluid delivered from the hydraulic pump; a work device moved with elongation and contraction of the hydraulic cylinder; a motor generator rotated by the engine to generate electric power; a first inverter that controls the motor generator; a traveling electric motor driven by the electric power generated by the motor generator; a second inverter connected to the first inverter through a DC bus to control output torque of the traveling electric motor; and a controller that controls a voltage of the DC bus, wherein, the controller is configured to decrease the output torque of the traveling electric motor when the voltage of the DC bus drops below a first threshold value as a load on the traveling electric motor increases.

In this manner, by arranging the controller that controls the voltage of the DC bus and configuring the controller to decrease the output torque of the traveling electric motor when the voltage of the DC bus drops below the first threshold value, even when the load on the traveling electric motor increases suddenly in the electric drive system in which a battery is not connected to the DC bus, such a situation can be avoided that the DC bus voltage drops to a level equal to or lower than an operating voltage of the inverters and the inverters stop working. Consequently, when the load on the traveling electric motor suddenly increases, a work operation by the work vehicle can be continued without stopping the traveling electric motor.

Advantage of the Invention

According to the present invention, even when the load on the traveling electric motor increases suddenly in the electric drive system in which a battery is not connected to the DC bus, such a situation can be avoided that the DC bus voltage drops to a level equal to or lower than the operating voltage of the inverters and the inverters stop working.

MODES FOR CARRYING OUT THE INVENTION

In the following, embodiments of the present invention are described with reference to the drawings.

First Embodiment

A work vehicle according to a first embodiment of the present invention is described with reference to FIGS. 1 to 8.

—Configuration—

Figure 1:
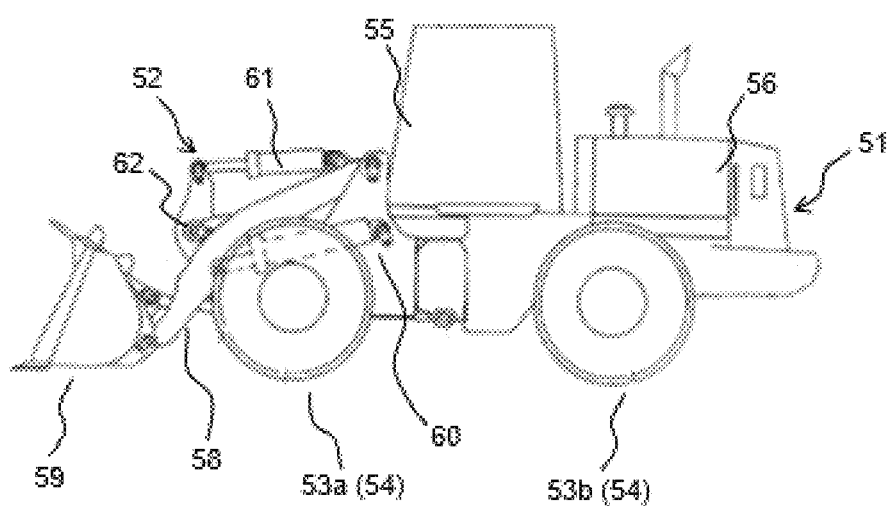
FIG. 1 is a view depicting an appearance of a wheel loader that is an example of a work vehicle of the present invention.

FIG. 1 is a view depicting an appearance of a wheel loader that is an example of the work vehicle of the present invention.

Referring to FIG. 1, the wheel loader includes a vehicle body 51 and a work device 52 mounted swingably in upward and downward directions at a front portion of the vehicle body 51. The vehicle body 51 includes a travel device 54 including front wheels (tires) 53a and rear wheels (tires) 53b, a cabin 55, an engine room 56 and so forth.

The work device 52 includes a pair of left and right lift arms 58 and a bucket 59, and the pair of left and right lift arms 58 are mounted pivotably in upward and downward directions at a front portion of the vehicle body 51 while the bucket 59 is mounted pivotably in upward and downward directions at an end portion of the lift arms 58. A pair of left and right lift arm cylinders 60 are mounted between the pair of left and right lift arms 58 and the vehicle body 51. The lift arm cylinders 60 are driven by hydraulic fluid from a hydraulic pump 4 (refer to FIG. 2) to drive the lift arms 58 in the upward and downward directions with respect to the vehicle body 51. The bucket 59 is coupled to a bucket cylinder 61, which is mounted on the vehicle body 51, through a bell crank 62 such that the bell crank 62 is pivoted by elongation and contraction of the bucket cylinder 61 to direct the bucket 59 up and down. The bucket cylinder 61 is driven by hydraulic fluid from the hydraulic pump 4 (refer to FIG. 2).

Figure 2:
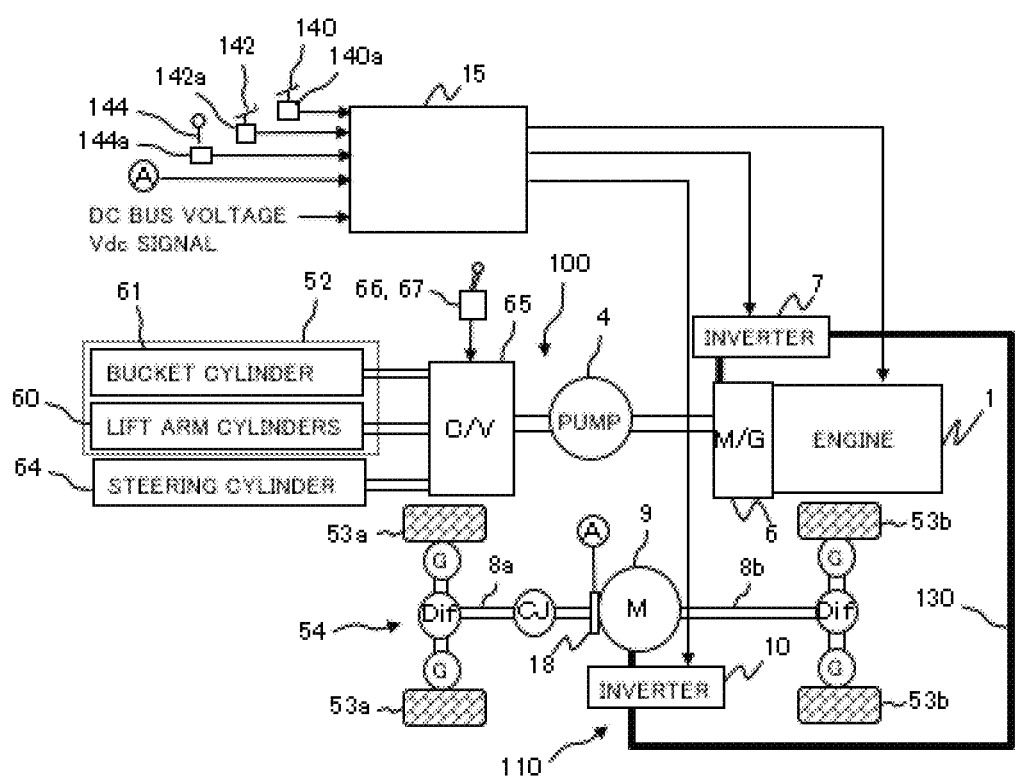
FIG. 2 is a view depicting a travel device of the wheel loader, a drive system for a work device and a drive system for the travel device.

FIG. 2 is a view depicting the travel device 54 of the wheel loader, a drive system for the work device 52 and a drive system for the travel device 54.

Referring to FIG. 2, the travel device 54 includes the front wheels (tires) 53a and the rear wheels (tires) 53b described hereinabove, a front wheel propeller shaft 8a for transmitting rotational power to the front wheels 53a through a differential gear, and a rear wheel propeller shaft 8b for transmitting rotational power to the rear wheels 53b through another differential gear.

Further, referring to FIG. 2, reference character 100 denotes the drive system for the work device 52, and reference character 110 denotes the drive system for the travel device 54.

The drive system 100 for the work device 52 includes the hydraulic pump 4 driven by an engine 1, the lift arm cylinders 60 and the bucket cylinder 61 described hereinabove, a steering cylinder 64, a control valve 65 for controlling hydraulic fluid to be supplied from the hydraulic pump 4 to the lift arm cylinders 60, the bucket cylinder 61 and the steering cylinder 64, operation lever devices 66 and 67 for generating operation signals for driving the lift arm cylinders 60 and the bucket cylinder 61 and switching corresponding spools in the control valve 65, and a steering wheel (not depicted) for generating an operation signal for driving the steering cylinder 64 and switching a steering valve in the control valve 65.

The drive system 110 of the travel device 54 includes an M/G (motor generator) 6 coupled to an output power shaft of the engine 1 and directly coupled to a rotary shaft of the engine 1 so as to be rotated by the engine 1 to perform power generation, an M/G inverter 7 (first inverter) for controlling the M/G 6, a traveling electric motor 9 driven by electric power from the M/G (motor generator) 6 to drive the propeller shafts 8a and 8b of the travel device 54 to be rotated, a traveling motor inverter 10 (second inverter) connected to the M/G inverter 7 through a DC bus (direct current bus) 130 to control the traveling electric motor 9, and a vehicle controller 15 for totally controlling the overall system.

The drive system 100 for the work device 52 is configured as a hydraulic drive system as described in such a manner as described above, and the work device 52 is hydraulically driven by the engine 1. Meanwhile, the drive system 110 for the travel device 54 is configured as an electric drive system, and the travel device 54 is electrically driven by the engine 1. The engine 1 used in common is a diesel engine.

Further, the drive system 110 of the travel device 54 includes an acceleration sensor 140a that detects an operation amount of an accelerator pedal 140 to generate an acceleration signal, a brake sensor 142a that detects an operation amount of a brake pedal 142 to generate a brake signal, an FNR position sensor 144a that detects an operation position of a forward and backward (FNR) lever 144 to generate a forward/reverse lever signal (FNR signal), and a speed sensor 18 that detects the number of rotations of the traveling electric motor 9 (vehicle speed) to generate a vehicle speed signal. To the vehicle controller 15, the acceleration signal, brake signal, FNR signal and vehicle speed signal are inputted. Further, to the vehicle controller 15, a DC bus voltage Vdc signal is inputted as an internal signal by CAN communication (refer to FIG. 4) from the M/G inverter 7. The vehicle controller 15 performs a predetermined calculation processing on the basis of the signals to totally control the drive system 110.

Figure 3:
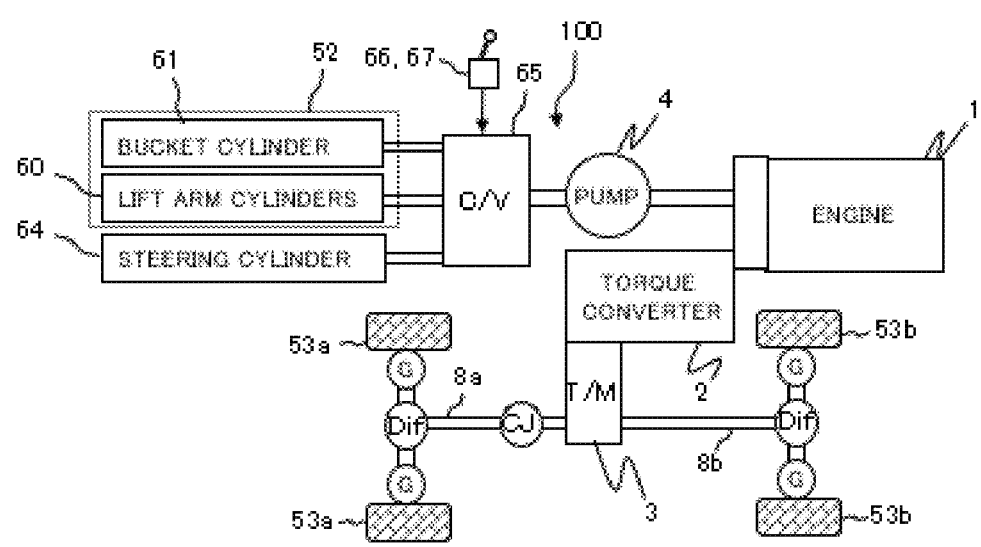
FIG. 3 is a view depicting a drive system for a travel device of a conventional wheel loader.

FIG. 3 is a view depicting a drive system for a travel device of a conventional wheel loader as a comparative example, and like elements to those depicted in FIG. 2 are denoted by like reference characters.

Referring to FIG. 3, in the drive system of the conventional travel device, a torque converter 2 and a transmission (T/M) 3 are connected to an engine 1 such that power of the engine 1 is transmitted for traveling to front wheels 53*a* and rear wheels 53*b* through the torque converter 2 and the transmission (T/M) 3. Further, lift arm cylinders 60 and a bucket cylinder 61 are driven by hydraulic fluid from a hydraulic pump 4 to drive lift arms 58 and a bucket 59 to perform excavation and transport of earth, sand and so forth.

In the drive system 110 of the travel device according to the present embodiment depicted in FIG. 2, the work device 5 is hydraulically driven by hydraulic fluid from the hydraulic pump 4 to perform an excavation work of earth, sand and so forth, similarly to the conventional machine (torque converter machine) of FIG. 3. On the other hand, the traveling operation of the vehicle is performed by driving the traveling electric motor 9 utilizing electric power generated by the M/G 6 rotated by power of the engine 1. The drive system targeted by the present embodiment is characterized in that none of a battery connected to the M/G 6 and a power storage device such as an electric double layer capacitor are incorporated, and therefore, control of the voltage of the DC bus 130 is performed by the M/G inverter 7 (described later).

In the drive system for the conventional travel device depicted in FIG. 3, the power transmission efficiency of the torque converter 2 is lower than the power transmission efficiency that is based on electric driving. In the present embodiment, the drive system 110 of the travel device is electrified in such a manner as depicted in FIG. 2 such that the efficiency of the power transmission from the engine 1 can be improved. Further, since, in works of the wheel loader, traveling operations for starting and stopping are repeated frequently, in the case where the travel device is electrified, it becomes possible to anticipate recovery of regenerated power from the traveling electric motor 9 upon braking, and the fuel consumption amount of the engine 1 can be reduced.

Figure 4:
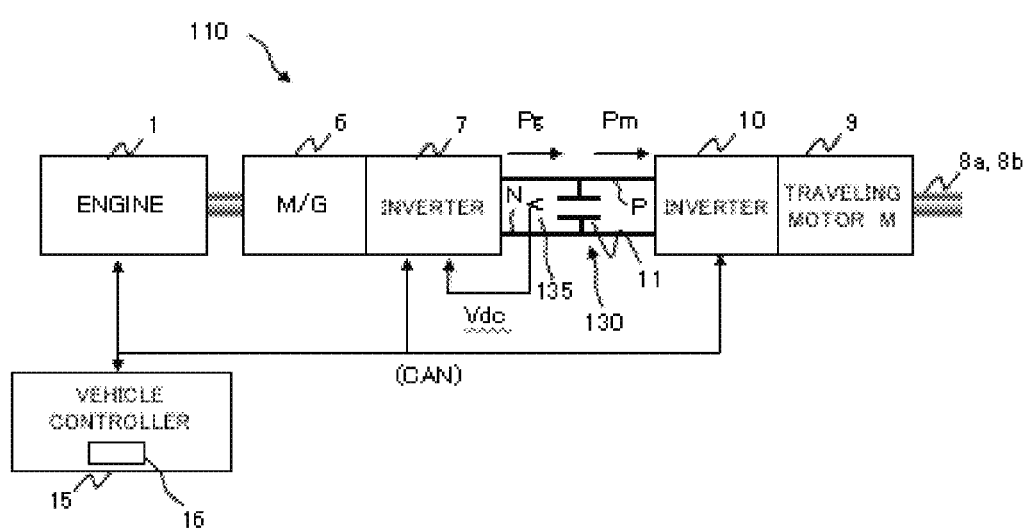
FIG. 4 is a view depicting a configuration of a drive system for a travel device in a present embodiment.

FIG. 4 is a view depicting a configuration of the drive system 110 for the travel device 54 in the present embodiment. In this drive system 110, the M/G 6 is driven to be rotated by the diesel engine 1 to perform power generation. Furthermore, the generated electric power is used to cause the traveling electric motor 9 to generate torque to drive the propeller shafts 8*a* and 8*b* to be rotated.

Here, when power is transmitted to the differential gears connected to the propeller shafts 8*a* and 8*b*, it is necessary to control the voltage of the DC bus 130 disposed between the M/G inverter 7 and the traveling motor inverter 10 to a predetermined value to make the generated power of the M/G 6 and the power consumption of the traveling electric motor 9 equal to each other thereby to establish balancing in power between them. Since the drive system 110 in the present embodiment does not have a power storage device, control of the voltage Vdc of the DC bus 130 is performed by the inverter 7 of the M/G 6 performing power generation. In particular, the charge amount of a smoothing capacitor 11 connected between the P and the N of the DC bus 130 is controlled such that the voltage Vdc of the DC bus 130 converges to a predetermined voltage.

Figure 5:
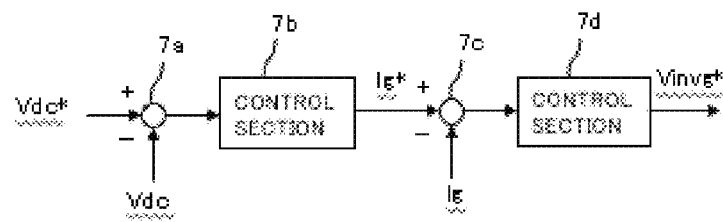
FIG. 5 depicts a control block for voltage control of a DC bus carried out by an M/G inverter.

FIG. 5 depicts a control block for voltage control of the DC bus 130 carried out by the inverter 7 of the M/G 6. In the voltage control of the DC bus 130 depicted in FIG. 5, feedback control of the voltage Vdc of the DC bus 130 is carried out by the M/G inverter 7. It is to be noted that the controlling method for the voltage Vdc of the DC bus 130 is not specifically restricted in terms of the type. In the present embodiment, the controlling method is described as a configuration for popular feedback control.

In the M/G inverter 7, a difference between a bus voltage command Vdc* inputted from the vehicle controller 15 and a detection value of the bus voltage Vdc obtained by a voltage sensor 135 is calculated first by a difference section 7*a*, and the difference (deviation) is inputted to a control section 7*b* configured from a proportional integral calculation or the like to calculate a current command Ig* of the M/G 6. Further, as a control system for the inner loop of the M/G 6, a detection value Ig of output current of the M/G 6 is fed back to the current command Ig* such that a deviation between the current command Ig* and the detection value Ig is calculated by a difference section 7*c*. This deviation is inputted to a control section 7*d* configured from a proportional integral calculation or the like such that an inverter voltage command Vinvg* of the M/G 6 is finally calculated. The M/G inverter 7 performs switching on the basis of the voltage command Vinvg* to control the charge amount Pg of the smoothing capacitor 11.

By causing the M/G inverter 7 of the M/G 6, which performs power generation, to perform control such that the voltage Vdc of the DC bus 130 becomes a predetermined voltage value (bus voltage command Vdc*), generated power from the M/G 6 can be accurately outputted with respect to the load power consumed by the traveling electric motor 9.

It is to be noted that, as regards the voltage control of the DC bus 130 depicted in FIG. 5, it is desirable to set the control gain such that a response characteristic as high as possible is obtained. The control gain is set such that the response of the current control system of the M/G 6 that is an inner loop becomes greater by several times than the response of the voltage control system for the DC bus 130 of an outer loop.

If the voltage control system for the DC bus 130 is constructed in such a manner as described above, then it becomes possible to output the generated power of the M/G 6 accurately with respect to load power necessary to drive the vehicle exerted by the traveling electric motor 9. However, in such a case that the response of the voltage control of the DC bus 130 by the M/G inverter 7 described above is high in time constant with respect to the load change of the traveling electric motor 9 or in a like case, a difference appears between the generated power Pg of the M/G 6 and load power Pm of the traveling electric motor 9, and as a result, there is the possibility that the voltage Vdc of the DC bus 130 may be significantly fluctuated. For example, when the load power Pm of the traveling electric motor 9 exceeds the generated power Pg of the M/G 6, the voltage Vdc of the DC bus 130 is significantly dropped. When the voltage drop of the voltage Vdc is very great, such a situation that the traveling motor inverter 10 is ceased to operate may possibly occur.

In the present embodiment, when the load power Pm of the traveling electric motor 9 exceeds the generated power Pg of the M/G 6, the voltage Vdc of the DC bus 130 is prevented from being dropped by a great amount.

Figure 6:
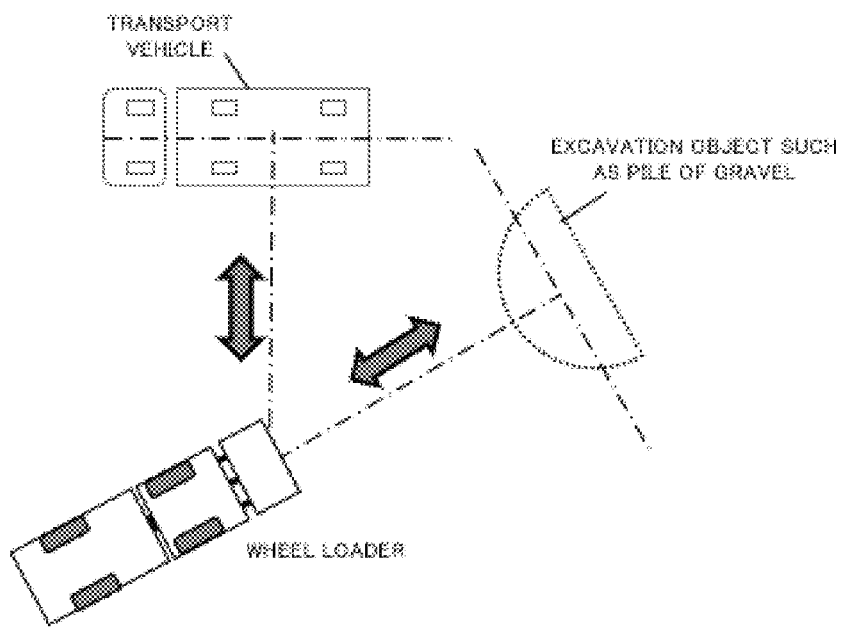
FIG. 6 is a view depicting an overview of a V-shaped excavation operation that is a basic operation of a wheel loader.

First, basic operation of the wheel loader that is an application target of the present invention is described. The most typical basic operation of the wheel loader is a V-shaped excavation work. An overview of this V-shaped excavation work is depicted in FIG. 6. As depicted in FIG. 6, the wheel loader first moves toward an excavation object such as a pile of gravel, and cargo such as gravel is loaded into the bucket 59 by plunging the bucket into the excavation object. Thereafter, the wheel loader moves back to its original position and then advances toward a transport vehicle such as a dump truck while steering operation is performed and the bucket portion of the front is moved up. Then, after the cargo is loaded on the transport vehicle (the cargo is discharged from the bucket), the vehicle returns to its original position. The vehicle repeatedly performs this work while drawing a V-shaped trail in such a manner as described above.

In the V-shaped excavation work described above, the following two ways available as operation by which there is the possibility that the load power Pm of the traveling electric motor 9 may exceed the generated power Pg of the M/G 6 and the voltage Vdc of the DC bus 130 may be greatly dropped.

The first one is excavation operation. In the wheel loader, when cargo is loaded into the bucket 59, an operator operates the accelerator pedal 140 to cause the bucket to plunge into an excavation object such as earth or sand. Further, in order to load a greater amount of cargo into the bucket 59, while the accelerator pedal 140 is further operated to increase traction of the vehicle (output torque of the traveling electric motor 9), the bucket 59 is pushed into the earth or sand. At this time, in the case where the bucket 59 is excessively pushed in, the tires sometimes slip due to a surplus amount of torque. While this slip phenomenon is an excessive action, since the tires are accelerated momentarily in the state in which the operator operates the accelerator pedal 140, the output power of the traveling electric motor 9 suddenly increases.

The second operation by which the voltage Vdc of the DC bus 130 may be possibly greatly dropped is a modulate operation. This modulation operation indicates an operation that, in the V-shaped excavation work described hereinabove, the wheel loader moves backwardly in a state in which cargo is loaded on the bucket 59 and thereafter moves forwardly again when the cargo is to be loaded into a dump truck. At this time, the operator normally switches the forward and backward (FNR) lever 144 from R (reverse) to F (forward) while the accelerator pedal 140 is kept operated. Therefore, when the vehicle moves forwardly after moving back (when the movement is switched between reverse and forward movements to perform switch back), since the traveling electric motor 9 is in a braked state at the time of reverse movement, a regeneration operation is performed. Thereafter, when the vehicle starts forward operation, power necessary for the vehicle to start is steeply demanded. At this time, a case in which the voltage Vdc of the DC bus 130 is greatly dropped may possibly occur.

When one of the two operations described above occurs, the M/G inverter 7 carries out feedback control of the voltage Vdc of the DC bus 130 as described hereinabove, and the M/G 6 is caused to operate such that convergence to a predetermined voltage value (bus voltage command Vdc*) is performed in response to a change in the voltage Vdc. However, although such a feedback control system as described above can be designed such that the response speed to a command is on the order of several ms, the followability to a load variation indicates a characteristic lower by one order or two orders in comparison with a command value response time constant. Therefore, when such a slip upon excavation operation or sudden start upon modulation operation as described above occurs (when a load variation occurs in the traveling electric motor 9), it is conceivable that the load power Pm exceeds the generated power Pg of the M/G 6 and the voltage Vdc of the DC bus 130 is greatly dropped. If, at this time, the voltage Vdc of the DC bus 130 drops to a level equal to or lower than the operating voltage of the traveling motor inverter 10, then there is the possibility that power supply from the traveling motor inverter 10 to the traveling electric motor 9 may be disabled and later excavation work may become difficult. When a power storage device such as a battery or an electric double layer capacitor is connected to the DC bus 130, it is possible to make up for the shortage of power in high responsiveness. However, in the electric drive system that is a target of the present embodiment, since it does not incorporate a power storage device, it is difficult to make up for the transient power shortage.

It is to be noted that a case in which the voltage Vdc of the DC bus 130 is greatly dropped according to increase in the load on the traveling electric motor 9 is not limited to the two cases described above (slip upon excavation operation and sudden start upon modulate operation). For example, in a low speed rotation state of the engine 1 in which the accelerator pedal 140 is not operated, since the voltage Vdc of the DC bus 130 has been dropped according to a drop of the power generation amount of the M/G 6, when the accelerator pedal is operated to start traveling from such a state as just described, the voltage Vdc of the DC bus 130 is sometimes greatly dropped by a response delay of the power generation operation of the M/G 6.

Therefore, in the present embodiment, in order to solve the subject described above, the drive system 110 operates such that it detects a load sudden change during traveling by the traveling electric motor 9 whose torque can be changed at the highest speed in the drive system 110 depicted in FIG. 4 to avoid a voltage drop of the DC bus 130 because of generated power shortage. To this end, the drive system 110 further includes a controller 16 for controlling the voltage of the DC bus.

In the present embodiment, the vehicle controller 15 serves also as the controller 16, and the controller 16 acts as a DC bus voltage drop prevention device that decreases, when the voltage of the DC bus 130 drops below a first threshold value V1 (hereinafter described) according to increase in the load on the traveling electric motor 9, the output torque of the traveling electric motor 9. Although the present embodiment is configured such that the vehicle controller 15 serves also as the controller 16, the controller 16 may be independently provided. Alternatively, the control section of the M/G inverter 7 or the traveling motor inverter 10 may be used as the controller 16. In the following, the DC bus voltage drop prevention device is described further with reference character 16 applied thereto.

Figure 7:
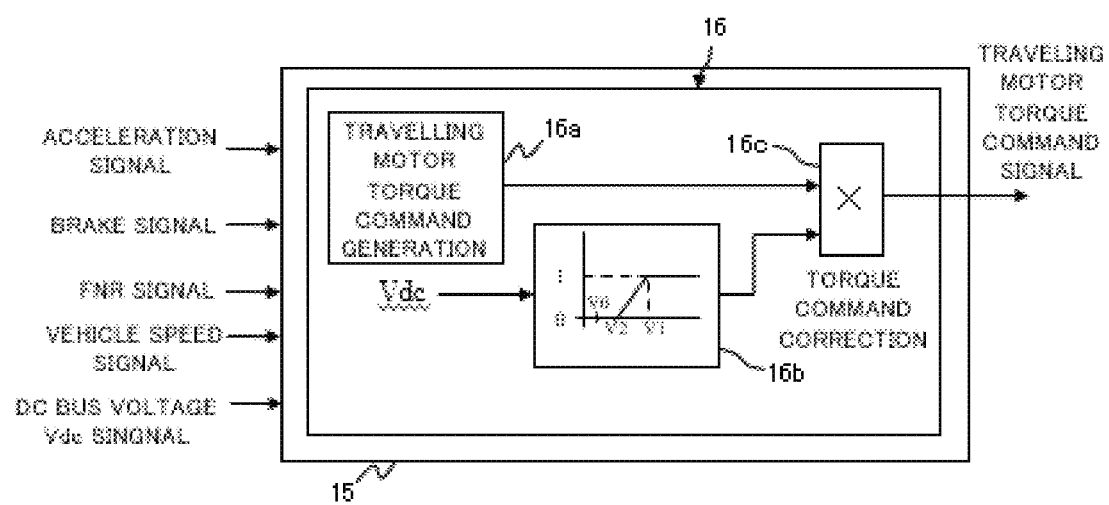
FIG. 7 is a view depicting a configuration of a DC bus voltage drop prevention device in a first embodiment of the present invention.
Figure 8:
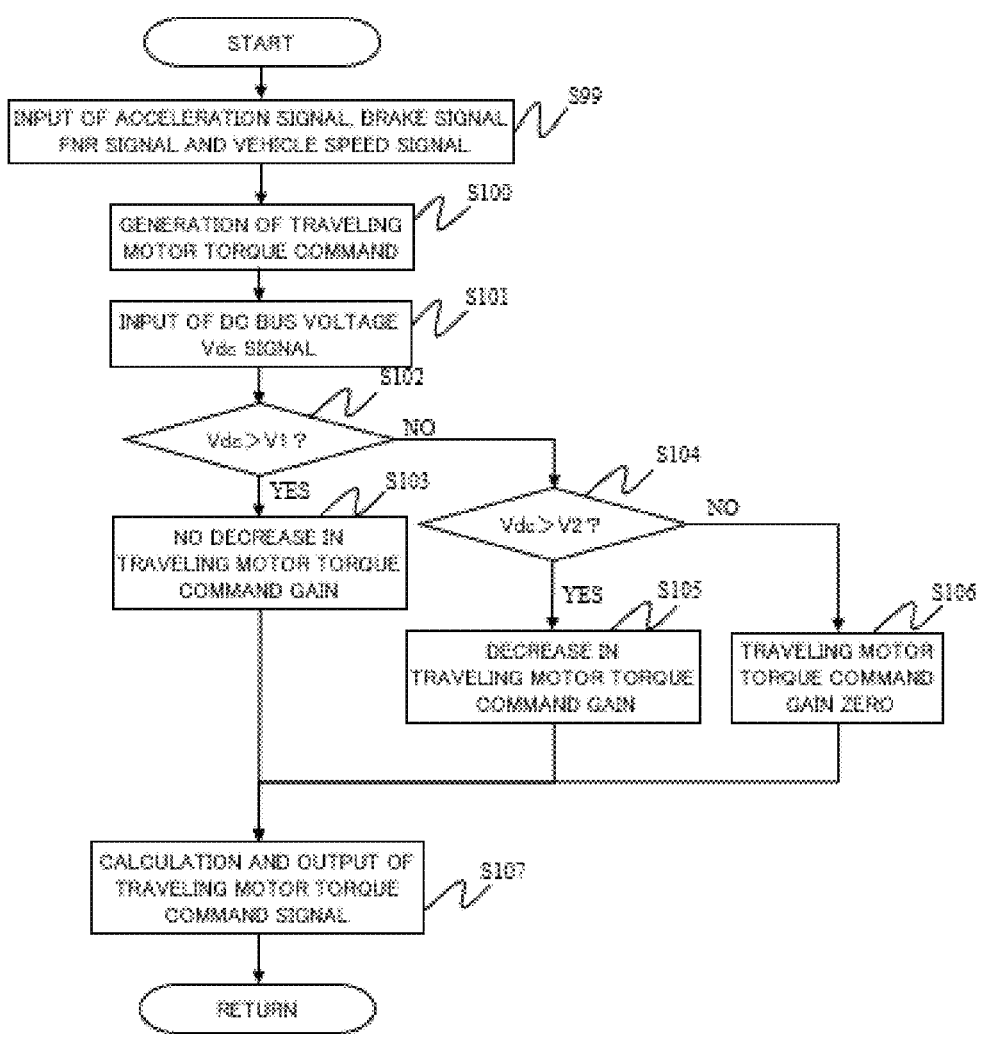
FIG. 8 is a flow chart depicting operation of the DC bus voltage drop prevention device.

FIG. 7 is a view depicting a configuration of the DC bus voltage drop prevention device 16, and FIG. 8 is a flow chart illustrating operation of the DC bus voltage drop prevention device 16. In the following, the configuration and the operation of the DC bus voltage drop prevention device 16 are described with reference to FIGS. 7 and 8.

As depicted in FIG. 7, the DC bus voltage drop prevention device 16 includes a traveling motor torque command generation section 16a, a torque command gain generation section 16b and a traveling motor torque command correction section (multiplier) 16c.

First, the DC bus voltage drop prevention device 16 receives an acceleration signal, a brake signal, an FNR signal and a vehicle speed signal as inputs thereto (S99), and the traveling motor torque command generation section 16a calculates a torque command to the traveling electric motor 9 (S100). The DC bus voltage drop prevention device 16 applies correction to the torque command in response to a change in the voltage Vdc of the DC bus 130. In particular, the DC bus voltage drop prevention device 16 receives a voltage Vdc signal of the DC bus 130 as an input thereto (S101), and the torque command gain generation section 16b calculates a torque command gain according to the magnitude of the voltage Vdc of the DC bus 130 (S102 to S106). Then, the traveling motor torque command correction section 16c multiplies the torque command to the traveling electric motor 9 by the torque command gain to correct the torque command to the traveling electric motor 9 and outputs the corrected torque command to the traveling electric motor 9 to the traveling motor inverter 10 (S107). It is to be noted that, though not depicted, the controller 16 sets a target rotational speed of the engine 1 on the basis of the acceleration signal of the acceleration sensor 140a that detects an operation amount of the accelerator pedal 140 or the torque command to the traveling electric motor 9 generated by the traveling motor torque command correction section 16c, and the control section of the engine 1 controls the rotational speed and the torque of the engine 1 on the basis of the target rotational speed.

Here, the torque command gain generation section 16b has such a characteristic of the command gain as indicated in a frame of the torque command gain generation section 16b. The axis of abscissa of the characteristic is the voltage Vdc of the DC bus 130 and the axis of ordinate is the torque command gain. The characteristic of the torque command gain is set such that, when the magnitude of the voltage Vdc of the DC bus 130 is greater than a first threshold value V1, the torque command gain to be generated is 1 (no increase or decrease in the torque command gain); when the voltage Vdc of the DC bus 130 drops below the first threshold value V1 and is greater than a second threshold value V2, the torque command gain to be generated decreases to be smaller than 1 as the voltage Vdc of the DC bus 130 drops (in the example depicted, decreases linearly) (the torque command gain decreases); and when the voltage Vdc of the DC bus 130 drops below the second threshold value V2, the torque command gain becomes zero.

As a result, when the torque command gain generation section 16b decides in a decision part in S102 that the magnitude of the voltage Vdc of the DC bus 130 is greater than the first threshold value V1, it generates a torque command gain 1 (there is no decrease in the torque command gain) in S103. At this time, although the traveling motor torque command correction section 16c multiplies, in S107, the torque command to the traveling electric motor 9 given from the traveling motor torque command generation section 16a by the torque command gain, since the torque command gain is 1, the traveling motor torque command after the processing does not change from that before the processing.

Thereafter. when the torque command gain generation section 16b decides in a decision part in S104 that the voltage Vdc of the DC bus 130 is lower than the first threshold value V1 and besides is greater than the second threshold value V2, it generates, in S105, a torque command gain smaller than 1 (reduces the torque command gain) according to the magnitude of the voltage Vdc of the DC bus 130. Then, in S107, the traveling motor torque command correction section 16c multiplies the torque command to the traveling electric motor 9 given from the traveling motor torque command generation section 16a by the gain smaller than 1 to correct the torque command to the traveling electric motor 9 such that the torque decreases in response to the drop of the voltage Vdc of the DC bus 130. In addition, when the torque command gain generation section 16b decides, in the decision part in S104, that the voltage Vdc of the DC bus 130 drops below the second threshold value V2, it sets the torque command gain to zero in S106. Then, in S107, the traveling motor torque command correction section 16c multiplies the torque command to the traveling electric motor 9 given from the traveling motor torque command generation section 16a by zero to decrease the torque command after the correction to zero.

Here, the first threshold value V1 is a value, for example, stored for setting in a memory of the controller 16 in advance, and is a predetermined voltage value set higher than the second threshold value V2 but lower than a voltage that is used upon traveling of the wheel loader, and is the lowest voltage value with which the traveling motor inverter 10 can exert power as indicated by the command value. The second threshold value V2 is a value, for example, stored for setting in the memory of the controller 16 in advance, and is set to a value higher than a voltage V0 of the DC bus 130 with which the traveling motor inverter 10 stops working.

From the foregoing, the DC bus voltage drop prevention device 16 decreases the output torque of the traveling electric motor 9 when the voltage of the DC bus 130 drops below the first threshold value V1.

Further, when the voltage of the DC bus 130 drops below the first threshold value V1, the DC bus voltage drop prevention device 16 decreases the output torque of the traveling electric motor 9 in response to the drop amount of the voltage of the DC bus 130.

Furthermore, when the voltage of the DC bus 130 drops below the second threshold value V2 lower than the first threshold value V1, the DC bus voltage drop prevention device 16 decreases the output torque of the traveling electric motor 9 to zero.

In the present embodiment configured in this manner, when the voltage of the DC bus 130 drops below the first threshold value V1, the DC bus voltage drop prevention device 16 controls the output torque of the traveling electric motor 9 so as to be decreased. Therefore, even when the load on the traveling electric motor 9 suddenly increases, it can be avoided that the voltage of the DC bus 130 drops below the operating voltage of the traveling motor inverter 10 and the traveling motor inverter 10 stops working. Consequently, when the load on the traveling electric motor 9 suddenly increases, it is possible to continue an excavation work or a modulate operation without stopping the traveling electric motor 9.

Further, when the voltage of the DC bus 130 drops below the first threshold value V1, the DC bus voltage drop prevention device 16 decreases the output torque of the traveling electric motor 9 in response to a drop amount of the voltage of the DC bus 130, and therefore, decrease in the output torque of the traveling electric motor 9 can be smoothly performed.

Furthermore, when the voltage of the DC bus 130 drops below the second threshold value V2 that is lower than the first threshold value V1, the DC bus voltage drop prevention device 16 decreases the output torque of the traveling electric motor 9 to zero, and therefore, the voltage Vdc of the DC bus 130 can be rapidly restored.

Second Embodiment

Figure 9:
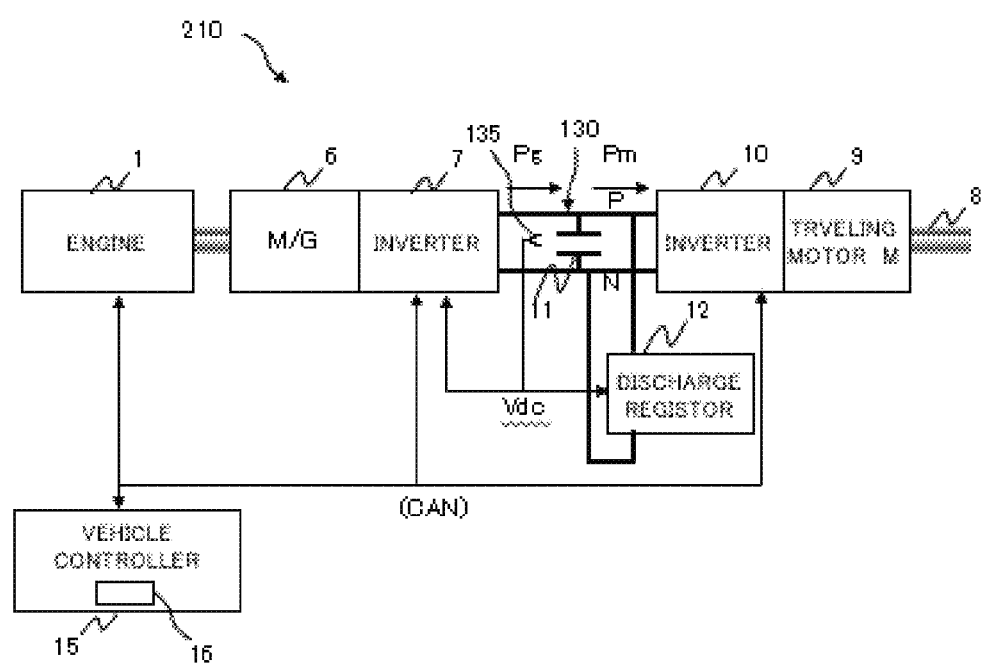
FIG. 9 is a view depicting a drive system for a travel device in a work vehicle of another embodiment of the present invention.

FIG. 9 is a view depicting a drive system for a travel device in a work vehicle of another embodiment of the present invention.

Referring to FIG. 9, a drive system 210 for a travel device of the present embodiment includes a discharge resistor 12 connected between the P and the N of the DC bus 130.

When the load power Pm of the traveling electric motor 9 becomes lower than the generated power Pg of the M/G 6, the voltage Vdc of the DC bus 130 greatly rises. In the present embodiment, when the voltage Vdc of the DC bus 130 rises equal to or greater than a predetermined value, the discharge resistor 12 operates to consume surplus power on the DC bus 130 to drop the voltage Vdc of the DC bus 130. In this manner, when the voltage Vdc of the DC bus 130 rises, it is possible to continue operation of the vehicle by utilizing the discharge resistor 12.

Other Embodiments

FIGS. 10, 11, 12 and 13 are views depicting, as other embodiments, modifications of the torque command gain generation section 16b of the DC bus voltage drop prevention device 16 depicted in FIG. 7.

Figure 10:
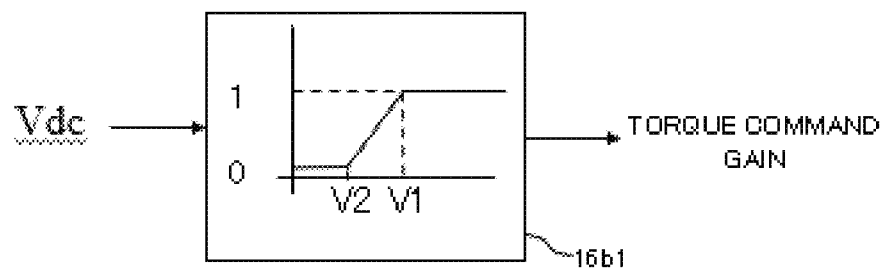
FIG. 10 is a view depicting a modification of a torque command gain generation section of the DC bus voltage drop prevention device.

Although, in the embodiments described hereinabove, the torque command gain generation section 16b sets the characteristic of the torque command gain such that, when the voltage of the DC bus 130 drops below the second threshold value V2, the torque command to the traveling electric motor 9 becomes zero, there is no necessity to set the torque command to the traveling electric motor 9 strictly to zero. For example, as depicted in FIG. 10, when the voltage Vdc of the DC bus 130 drops below the second threshold value V2, a torque command gain generation section 16b1 may set a characteristic of the torque command gain such that it has a value within a range of the magnitude with which the wheel loader stays stationary on a level ground (such a small value that the wheel loader does not start moving on a level ground). By the setting, when the voltage of the DC bus 130 drops below the second threshold value V2 that is lower than the first threshold value V1, the DC bus voltage drop prevention device 16 controls the output torque of the traveling electric motor 9 to be decreased to a value within a range of the magnitude with which the wheel loader (work vehicle) stays stationary on a level ground. Even where the output torque of the traveling electric motor 9 is controlled in this manner, since the output torque of the traveling electric motor 9 comes to have a small value near to zero, the voltage Vdc of the DC bus 130 can be quickly restored.

Figure 11:
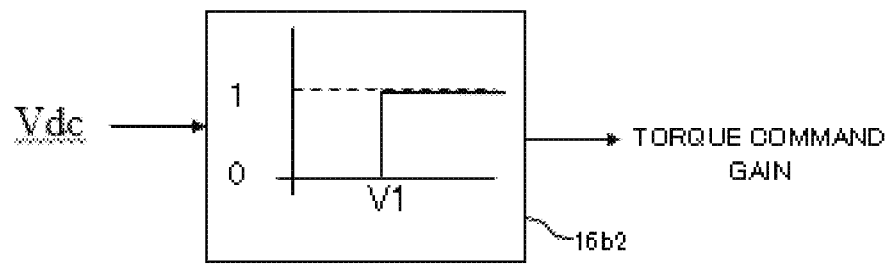
FIG. 11 is a view depicting another modification of the torque command gain generation section of the DC bus voltage drop prevention device.

Further, while, in the embodiments described hereinabove, the torque command gain generation section 16b sets the characteristic of the torque command gain such that, when the voltage of the DC bus 130 drops below the first threshold value V1, the torque command gain is reduced according to the drop of the voltage Vdc of the DC bus 130, the torque command gain generation section 16b2 may set the characteristic of the torque command gain such that, when the voltage Vdc of the DC bus 130 drops below the first threshold value V1, the output torque of the traveling electric motor 9 becomes zero as depicted in FIG. 11. By this setting, when the voltage of the DC bus 130 drops below the first threshold value V1, the DC bus voltage drop prevention device 16 decreases the output torque of the traveling electric motor 9 to zero. By controlling in this manner, when the voltage Vdc of the DC bus 130 decreases, even when the degree of the change is great (the rate of change is large), it is possible to reduce the output torque of the traveling electric motor 9 in a good response and quickly restore the voltage Vdc of the DC bus 130.

Figure 12:
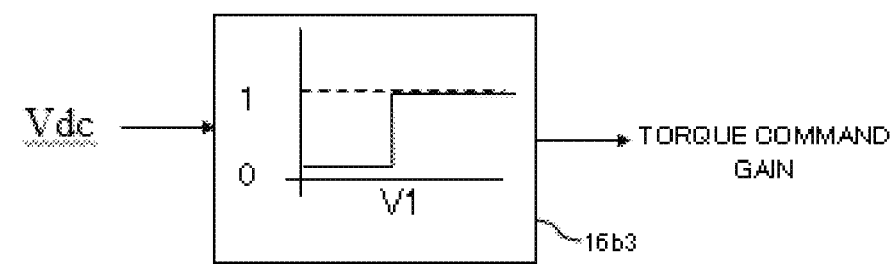
FIG. 12 is a view depicting a further modification of the torque command gain generation section of the DC bus voltage drop prevention device.

It is to be noted that, also in this case, similarly to the modification depicted in FIG. 10, a torque command gain generation section 16b3 may set a characteristic of the torque command gain such that, when the voltage Vdc of the DC bus 130 drops below the second threshold value V2, it has a value within a range of the magnitude with which the wheel loader stays stationary on a level ground, as depicted in FIG. 12.

Figure 13:
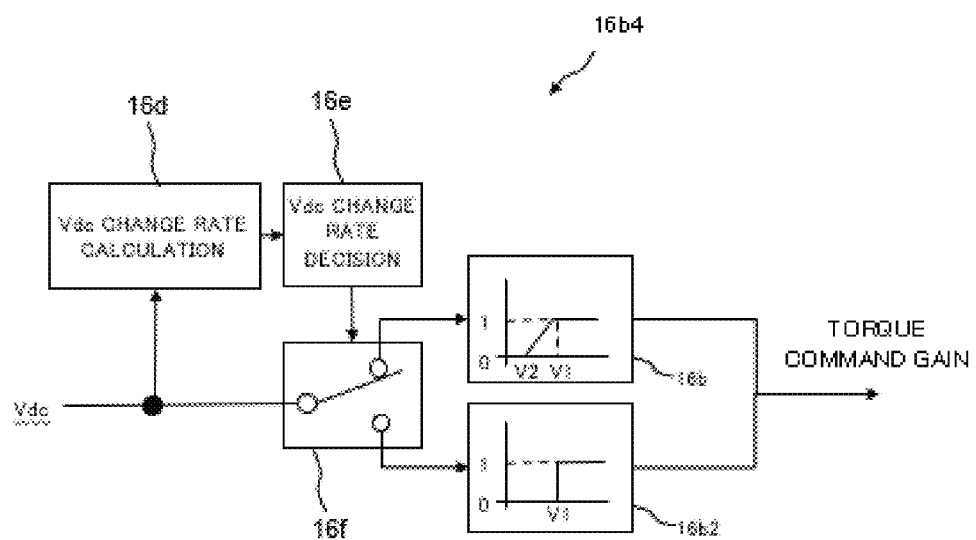
FIG. 13 is a view depicting a still further modification of the torque command gain generation section of the DC bus voltage drop prevention device.

Further, when the voltage of the DC bus 130 drops below the first threshold value V1, the output torque of the traveling electric motor 9 may be controlled such that the output torque of the traveling electric motor 9 becomes zero in response to the degree of change in the voltage Vdc. FIG. 13 is a view depicting a configuration of a torque command gain generation section 16b4 in such a case as just described.

Referring to FIG. 13, the torque command gain generation section 16b4 includes the torque command gain generation section 16b depicted in FIG. 7 and the torque command gain generation section 16b2 depicted in FIG. 11 and besides includes a DC bus voltage Vdc change rate calculation section 16d, a DC bus voltage Vdc change rate decision section 16e and a switch section 16f.

The DC bus voltage Vdc change rate calculation section 16d calculates a rate of change in the voltage Vdc of the DC bus 130, and the DC bus voltage Vdc change rate decision section 15e decides whether or not the rate of change in the voltage Vdc is higher than a preset value. Further, the DC bus voltage Vdc change rate decision section 16e holds, when the rate of change in the voltage Vdc is equal to or lower than the preset value, the switch section 16f at a connection position on the upper side in FIG. 13, and when the rate of change in the voltage Vdc is higher than the preset value, the DC bus voltage Vdc change rate decision section 16e switches the switch section 16f to a connection position on the lower side in FIG. 13.

When the switch section 16f is held in the connection position on the upper side in FIG. 13, the DC bus voltage Vdc signal is feedback slit inputted to the torque command gain generation section 16b, and a torque command gain is generated by the torque command gain generation section 16b. If the switch section 16f is switched to the connection position on the lower side in FIG. 13, then the DC bus voltage Vdc signal is inputted to a torque command gain generation section 16b2, and a torque command gain is generated by the torque command gain generation section 16b2.

Consequently, when the rate of change in the DC bus voltage Vdc is equal to or lower than the preset value in a case where the DC bus voltage Vdc drops below the first threshold value V1, the DC bus voltage drop prevention device 16 decreases the output torque of the traveling electric motor 9 in response to the drop amount of the DC bus voltage Vdc. However, when the rate of change in the DC bus voltage Vdc is higher than the preset value, the DC bus voltage drop prevention device 16 decreases the output torque of the traveling electric motor 9 to zero or to a value within a range of the magnitude with which the wheel loader stays stationary on the level ground. Consequently, when the rate of change in the voltage Vdc is low (the rate of change is equal to or lower than the preset value) in the case where the voltage Vdc of the DC bus 130 drops, the output torque of the traveling electric motor 9 is decreased in response to the drop amount of the voltage of the DC bus 130 as in the first embodiment, and decrease in the output torque of the traveling electric motor 9 can be smoothly performed. On the other hand, when the degree of change in the voltage Vdc of the DC bus 130 is high (the rate of change is higher than the preset value), the output torque of the traveling electric motor is reduced in high responsiveness, and the voltage Vdc of the DC bus 130 can be smoothly restored.

It is to be noted that the torque command gain generation section 16b4 may include the torque command gain generation section 16b1 depicted in FIG. 10 in place of the torque command gain generation section 16b or may include the torque command gain generation section 16b3 depicted in FIG. 12 in place of the torque command gain generation section 16b2.

Figure 14:
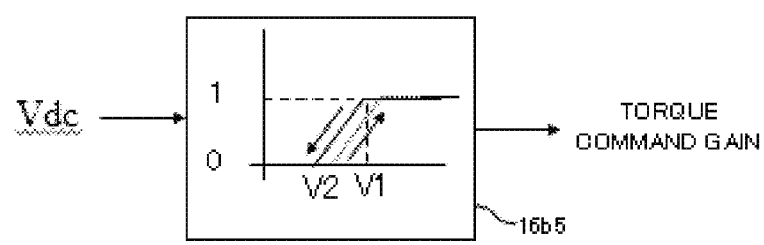
FIG. 14 is a view depicting a yet further modification of the torque command gain generation section of the DC bus voltage drop prevention device.

Further, the DC bus voltage drop prevention device 16 may be configured such that it causes the output torque of the traveling electric motor 9 to have a hysteresis characteristic such that, when the DC bus voltage Vdc restores after it has been dropped below the first threshold value V1 and the output torque of the traveling electric motor 9 decreases to zero (minimum value), the timing at which the output torque of the traveling electric motor 9 begins to increase is delayed. FIG. 14 is a view depicting a configuration of a torque command gain generation section 16b5 in such a case as just described.

Referring to FIG. 14, the torque command gain generation section 16b5 is configured such that the torque command gain has a hysteresis characteristic such that, after the voltage of the DC bus 130 drops below the second threshold value V2 and the torque command to the traveling electric motor 9 is decreased to zero (minimum value), when the voltage Vdc restores and the torque command gain is increased to restore a regular torque command value, the torque command gain begins to increase when the voltage of the DC bus 130 increases to a value higher than the second threshold value V2. By the configuration, it is possible to suppress oscillation of control due to a measurement error of the DC bus voltage Vdc and achieve stabilized motor torque control.

It is to be noted that, although, in the modification of FIG. 14, the torque command gain generation section 16b depicted in FIG. 7 has a hysteresis characteristic, the torque command gain generation sections depicted in FIGS. 10 to 13 may have a hysteresis characteristic.

DESCRIPTION OF REFERENCE CHARACTERS

1: Engine
4: Hydraulic pump
6: Motor generator (M/G)
7: M/G inverter (first inverter)
8a: Front wheel propeller shaft
8b: Rear wheel propeller shaft
9: Traveling electric motor
10: Traveling motor inverter (second inverter)
11: Smoothing capacitor
12: Discharge resistor
15: Vehicle controller
16: DC bus voltage drop prevention device (controller)
16a: Traveling motor torque command generation section
16b: Torque command gain generation section
16b1, 16b2, 16b3, 16b4, 16b5: Torque command gain generation section
16c: Traveling motor torque command correction section
16d: DC bus voltage Vdc change rate calculation section
16e: DC bus voltage Vdc change rate decision section
16f: Switch section
18: Speed sensor
51: Vehicle body
52: Work device
54: Travel device
100: Drive system for work device
110: Drive system for travel device
130: DC bus (direct current bus)
140a: Acceleration sensor
142a: Brake sensor
144a: FNR position sensor

The invention claimed is:

1. A work vehicle, comprising:
an engine;
a hydraulic pump driven by the engine;
a hydraulic cylinder driven by hydraulic fluid delivered from the hydraulic pump;
a work device moved with elongation and contraction of the hydraulic cylinder;
a motor generator rotated by the engine to generate electric power;
a first inverter that controls the motor generator;
a traveling electric motor driven by the electric power generated by the motor generator;
a second inverter connected to the first inverter through a DC bus to control output torque of the traveling electric motor; and
a controller that controls a voltage of the DC bus, wherein,
the controller is configured to decrease the output torque of the traveling electric motor according to an amount of decrease in the voltage of the DC bus when the voltage of the DC bus drops below a first threshold value as a load on the traveling electric motor increases; and wherein,
the controller is configured to decrease the output torque of the traveling electric motor to a value within a range of magnitude with which the work vehicle stays stationary on a level ground when the voltage of the DC bus drops below a second threshold value lower than the first threshold value.

2. The work vehicle according to claim 1, further comprising:
a discharge resistor connected to the DC bus.

3. The work vehicle according to claim 1, wherein the controller includes:
a traveling motor torque command generation section configured to input an acceleration signal, a brake signal, a forward/reverse lever signal and a vehicle speed signal and calculate a torque command to the traveling electric motor,
a torque command gain generation section configured to input the voltage of the DC bus and calculate a torque command gain according to a magnitude of the voltage of the DC bus, and
a traveling motor torque command correction section configured to multiply the torque command to the traveling electric motor by the torque command gain to correct the torque command to the traveling electric motor and output the corrected torque command to the traveling electric motor to the second inverter.

4. The work vehicle according to claim 1, wherein the controller is configured to set the second threshold value to a value higher than the voltage of the DC bus with which the second inverter stops working.

5. A work vehicle, comprising:
an engine;
a hydraulic pump driven by the engine;
a hydraulic cylinder driven by hydraulic fluid delivered from the hydraulic pump;
a work device moved with elongation and contraction of the hydraulic cylinder;
a motor generator rotated by the engine to generate electric power;

a first inverter that controls the motor generator;
a traveling electric motor driven by the electric power generated by the motor generator;
a second inverter connected to the first inverter through a DC bus to control output torque of the traveling electric motor; and
a controller that controls a voltage of the DC bus, wherein,
the controller is configured to decrease the output torque of the traveling electric motor when the voltage of the DC bus drops below a first threshold value as a load on the traveling electric motor increases; and wherein,
the controller is configured to decrease the output torque of the traveling electric motor according to an amount of decrease in the voltage of the DC bus when the rate of change in the voltage of the DC bus is not exceeding a preset value in a case where the voltage of the DC bus drops below the first threshold value, and to decrease the output torque of the traveling electric motor to zero or a value within a range of magnitude with which the work vehicle stays stationary on a level ground when the rate of change in the voltage of the DC bus is exceeding the preset value in the case where the voltage of the DC bus drops below the first threshold value.

6. A work vehicle, comprising:
an engine;
a hydraulic pump driven by the engine;
a hydraulic cylinder driven by hydraulic fluid delivered from the hydraulic pump;
a work device moved with elongation and contraction of the hydraulic cylinder;
a motor generator rotated by the engine to generate electric power;
a first inverter that controls the motor generator;
a traveling electric motor driven by the electric power generated by the motor generator;
a second inverter connected to the first inverter through a DC bus to control output torque of the traveling electric motor; and
a controller that controls a voltage of the DC bus, wherein,
the controller is configured to decrease the output torque of the traveling electric motor when the voltage of the DC bus drops below a first threshold value as a load on the traveling electric motor increases; and wherein,
the controller is configured to provide a hysteresis characteristic such that a timing at which the output torque of the traveling electric motor begins to increase is delayed when the voltage of the DC bus restores after the voltage of the DC bus is dropped below the first threshold value and the output torque of the electric motor decreases to a minimum value.

* * * * *